(12) United States Patent
Myhre (10) Patent No.: US 6,487,904 B1
(45) Date of Patent: Dec. 3, 2002

(54) METHOD AND SENSOR FOR MASS FLOW MEASUREMENT USING PROBE HEAT CONDUCTION

(75) Inventor: Douglas C. Myhre, Eden Prairie, MN (US)

(73) Assignee: Rosemont Aerospace Inc., Burnsville, MN (US)

( * ) Notice: Subject to any disclaimer, the term of this patent is extended or adjusted under 35 U.S.C. 154(b) by 0 days.

(21) Appl. No.: 09/710,547

(22) Filed: Nov. 9, 2000

(51) Int. Cl.[7] ................................................. G01F 1/68
(52) U.S. Cl. ................................................. 73/204.12
(58) Field of Search .............................. 73/204.12, 295, 73/204.22, 204, 49.2, 202, 202.5, 204.26

(56) References Cited

U.S. PATENT DOCUMENTS

| | | | |
|---|---|---|---|
| 4,016,758 A | | 4/1977 | Taylor |
| 4,135,396 A | * | 1/1979 | Stanke et al. .................. 73/204 |
| 4,590,797 A | * | 5/1986 | Beaubatie et al. ............. 73/295 |
| 4,603,580 A | * | 8/1986 | Waring ......................... 73/295 |
| 4,781,057 A | * | 11/1988 | Hyfantis, Jr. et al. ......... 73/49.2 |
| 4,949,578 A | | 8/1990 | Harpster |

FOREIGN PATENT DOCUMENTS

SE  8889845 C  9/1953

OTHER PUBLICATIONS

Flow Measurement—Practical Guides for Measurement and Control; Jan. 1996; D.W. Spitzer, Editor Introduction to Heat and Mass Transfer; Eckert and Gross; McGraw-Hill, 1963, pp. 32–36.

* cited by examiner

Primary Examiner—Benjamin R. Fuller
Assistant Examiner—Jewel V. Thompson
(74) Attorney, Agent, or Firm—James M. Rashid; Calfee, Halter & Griswold LLP (57) ABSTRACT

A mass flow sensor is disclosed comprising: a heated probe having a predetermined length for disposition in the path of mass flow; at least two first temperature measuring devices disposed at different points along the probe length for measuring temperatures of the heated probe at such points in the presence of the mass flow; a second temperature measuring device for disposition in the path of mass flow for measuring the temperature of the mass flow; and a processing unit for determining mass flow as a function of the temperature measurements of the first and second temperature measuring devices. A method of measuring mass flow is also disclosed comprising the steps of: disposing a probe of a predetermined length in the path of mass flow; heating the probe; measuring the heated probe temperature at at least two different points along its length in the presence of the mass flow; measuring the temperature of the mass flow; and determining mass flow as a function of the temperature measurements of the heated probe and mass flow. In one embodiment, the mass flow sensor includes at least three temperature measuring devices disposed in proximity to at least one probe for generating signals representative of the temperature of the heated probe along its length and the temperature of the mass flow. The at three temperature measuring devices are coupled together to generate at least two signals representative of temperature differentials in the vicinity of the at least one probe, and the processing unit processes at least one of the temperature differential signals to generate a signal representative of mass flow.

28 Claims, 10 Drawing Sheets

METHOD AND SENSOR FOR MASS FLOW MEASUREMENT USING PROBE HEAT CONDUCTION

BACKGROUND OF THE INVENTION

The present invention is directed to mass flow sensors of the thermal type, in general, and more specifically to a mass flow sensor including a heated probe having a predetermined length disposed in the path of mass flow; at least two first temperature measuring devices disposed at different points along said length for measuring temperatures at said points of the heated probe in the presence of the mass flow, a second temperature measuring device for measuring the temperature of the mass flow, and means for determining mass flow as a function of said temperature measurements of the heated probe and said temperature measurement of the mass flow, and a method of measuring mass flow.

Mass flow sensors of the thermal type generally involve exposing a self-heated resistance element to the media flow and measuring the cooling effect of the media on the self-heated element, conventionally by its resistance change. If the media temperature can vary, a temperature sensor measurement is also made to get an accurate ambient temperature measurement. A resistance measurement of the self-heated element can be related to media mass flow. This method is also called hot-wire (or hot-film) anemometry and has been used since about 1950.

A similar approach involves locating a heater in the path of the media or around the pipe or duct through which the media is flowing with temperature sensors disposed on either side. For measuring the temperature $T_1$ of the media upstream of the heater and the temperature $T_2$ downstream of the heater. $T_1$ is used for reference purposes while $T_2$ located downstream of the heater is used to sense the additional heat transferred from the heater by the moving fluid. The heat input ($Q_H$) and the mass flow rate ($Q_M$) are related by the equation:

$$Q_H = c(T_2 - T_1)Q_M,$$

where c is the specific heat of the fluid.

If the heater is located directly in the media flow, high power consumption is often required. An alternate approach is the "boundary-layer" flowmeter in which only the layer of the media fluid closest to the pipe or duct wall if heated and subjected to the aforementioned temperature measurements.

There are a number of variations of the thermal approach being used today including those using direct heating of the media fluid, and a single or dual probes containing self-heated temperature sensing elements. The method using direct heating of the fluid does so in a small "bypass" duct and is referred to as a "parallel method" of measurement. A primary alternative is the "series method" which places a probe or probes directly in the media flow path within the pipe or duct. Also, the self-heated and sensor elements use a variety of technologies such as platinum, tungsten or other resistance temperature devices (RTDs), thermistor deposited films, and the like, for example.

Mass flowmeters of the thermal type are most often used in aircraft applications because the sensors are small. Light weight, easy to install, flexible for different ranges, and create minimal restrictions to flow in the piping or duct, which results in a low pressure drop across the measurement section thereof. Such applications include engine bleed air, environmental control systems for avionics cooling, cabin environmental air, fuel cell gas flow and the like, for example.

One such flow sensor uses a thermal based immersion sensor incorporating a single probe which contains an ambient element and a self-heated element. The ambient element senses the ambient temperature of the media flow in the pipe or duct while the self-heated element measures the cooling effect of the media flow in the duct. By monitoring the cooling effect of the self-heated element and the ambient temperature of the duct media flow, the mass flow can then be determined by a signal processing unit. The signal processor receives the cooling effect and ambient temperature measurements from each sensor and calculates the corresponding mass flow rate. Typically, a cooling effect sensor is calibrated for a low flow value in order to trigger a means of increasing the cooling flow, and, once cooling is achieved, reduces cooling much like a thermostat controls temperature, for example. The principles of the sensor/signal processor are relatively simple. Two basic parameters (cooling effect and ambient temperature) are measured and the signal processor mathematically combines these measurements to provide the desired output. A drawback for this type of sensor is incomplete isolation of the self-heated element from the ambient element. Conductive or convective heat transfer between the probes will result in an error in measurement. Also, the effect of the mounting surface temperature can cause errors in measurement, especially if the probe is short.

Another thermal type of mass flow sensor uses two platinum resistance temperature (PRT) elements disposed in the path of media flow to directly measure mass flow. One element is used to sense ambient flow temperature while the other is self-heated to sense flow velocity. The elements may be contained in the same probe or two different probes. By self-heating the sensing element to a fixed temperature difference higher than ambient, the amount of power supplied to the element will be indicative of mass flow. Processing electronics include a "flow bridge" which is used to power the self-heated element and convert the changes in resistance of the PRT elements to a signal which is representative of mass flow. It is recognized that the resistance of the sensing elements of these type sensors is indicative of temperature only if several error sources are identified and minimized through sophisticated electronics.

One such source of error is the heat generated in the ambient sensor resistance wire due to passage of the current utilized to measure the resistance. This heating effect ($I^2 R$ or Joule heating) results in a higher element temperature than the ambient and causes an erroneous reading, especially at low flow rates. This error is referred to as the self-heating error. The self-heating error, defined as the temperature difference between the surrounding (ambient) temperature and the temperature at which the sensing element equilibrates, is a function of the element resistance (R), the current flowing through the element (I) and the heat transfer field around the sensor.

Self heating of the cooling effect sensor also causes an error in measurement. Since the RTD is a non-linear device, there is typically an error associated with ambient temperature compensation. Another problem associated with these immersion type devices is the reduced sensitivity of the device at higher mass flows. It is a phenomena that occurs as a natural result of the relative reduced heat transfer of a probe in crossflow. Sometimes this reduction is enhanced by the slope of the RTD which can limit the application of this type of device.

Another similar thermal type mass flow sensor which is based on the velocity effect and temperature measurements utilize thermister sensors for measuring the dissipated heat and ambient temperatures. One such sensor uses a single probe which contains dual thermisters at the tip for measuring the flow of dissipated heat of heater windings wrapped around their housing. The dual thermisters essentially measure the temperature of the heater. There are also dual thermisters, located in open flow, for measuring the ambient temperature. A controller provides the heater windings with a constant current or a temperature driven voltage. By using dual thermisters to measure ambient temperature as a reference, the tip thermisters may be used to infer flow velocity of the media across the heater windings. While thermisters are less costly then PRTs, they are limited in range of temperature covered as compared to PRTs and need rather complex signal conditioning circuits. In addition, since the thermisters are not self-heated, these thermister-based sensors require an additional heater element for heating the probe.

The present invention includes an improved sensor design for and method of measuring mass flow, which overcomes the aforementioned drawbacks of the current mass flow sensors.

SUMMARY OF THE INVENTION

In accordance with one aspect of the present invention, a mass flow sensor comprises: a probe having a predetermined length for disposition in the path of mass flow; means for heating the probe; at least two first temperature measuring devices disposed at different points along the length for measuring temperatures of the heated probe at such points in the presence of the mass flow; a second temperature measuring device for disposition in the path of mass flow for measuring the temperature of the mass flow; and means for determining mass flow as a function of the temperature measurements of the first and second temperature measuring devices.

In accordance with another aspect of the present invention, a method of measuring mass flow comprises the steps of: disposing a probe of a predetermined length in the path of mass flow; heating the probe; measuring the heated probe temperature at at least two different points along its length in the presence of the mass flow; measuring the temperature of the mass flow; and determining mass flow as a function of the temperature measurements of the heated probe and mass flow.

In accordance with yet another aspect of the present invention, a mass flow sensor comprises: at least one probe having a predetermined length for disposition in the path of mass flow; means for heating the at least one probe; at least three temperature measuring devices disposed in proximity to the at least one probe for generating signals representative of the temperature of the heated probe along its length and the temperature of the mass flow; means for generating at least two signals representative of temperature differentials in the vicinity of the at least one probe from the signals generated by the at least three temperature measuring devices; and means for processing at least one of the temperature differential signals to generate a signal representative of mass flow.

DETAILED DESCRIPTION OF THE INVENTION

Figure 1:
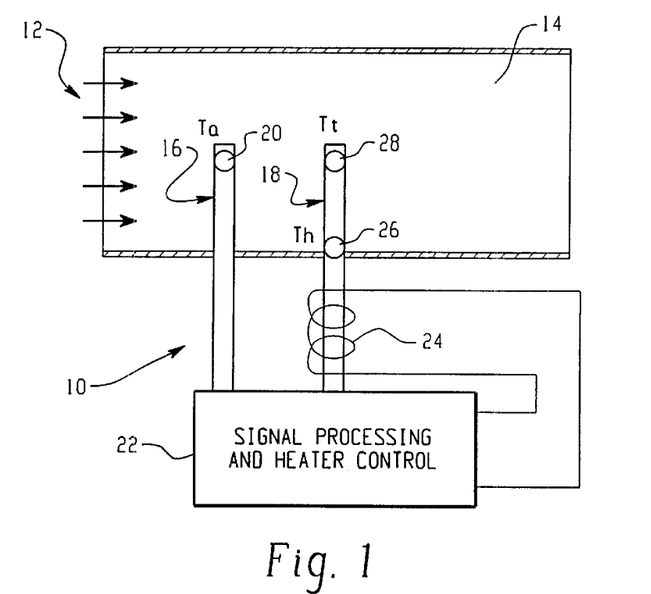
FIG. 1 is a block diagram schematic of a mass flow sensor suitable for embodying the principles of the present invention.

An embodiment of one aspect of the present invention is illustrated in the sketch of FIG. 1. The embodiment is one of a dual probe mass flow sensor 10 with at least three thermocouples in the path of media flow 12 through a cross flow tube 14, which may be a pipe, or duct, or the like, for example. Referring to FIG. 1, a first probe 16 of a predetermined length is disposed in the path of mass flow upstream of a second probe 18 which also has a predetermined length disposed in the path of the mass flow. A first thermocouple depicted by a circle 20 is disposed on the first probe 16 at a location along the length thereof, preferably at the tip, for measuring the temperature Ta of the media flow 12 which may be representative of its ambient temperature. Both probes 16 and 18 are coupled to a signal processing and heater control unit 22 which is located in the present embodiment outside of the duct 14 and isolated from the mass flow 12. A heater element 24 which may be a coiled wire, for example, is disposed at the base of the second probe 18 for the heating thereof. The heater element 24 is coupled to and controlled by the heater control portion of the unit 22 conventionally by passing a metered amount of current therethrough as will become better understood from the description herein below. A second thermocouple depicted by a circle 26 is disposed at the second probe 18 in the vicinity of the heater element 24 for measuring the temperature Th of the probe 18 at the source of heating. In the present embodiment, a third thermocouple depicted by a circle 28 is disposed along the length of the second probe 18, preferably at the tip, for measuring the temperature Tt of the heated probe at a point along its length.

Figure 2:
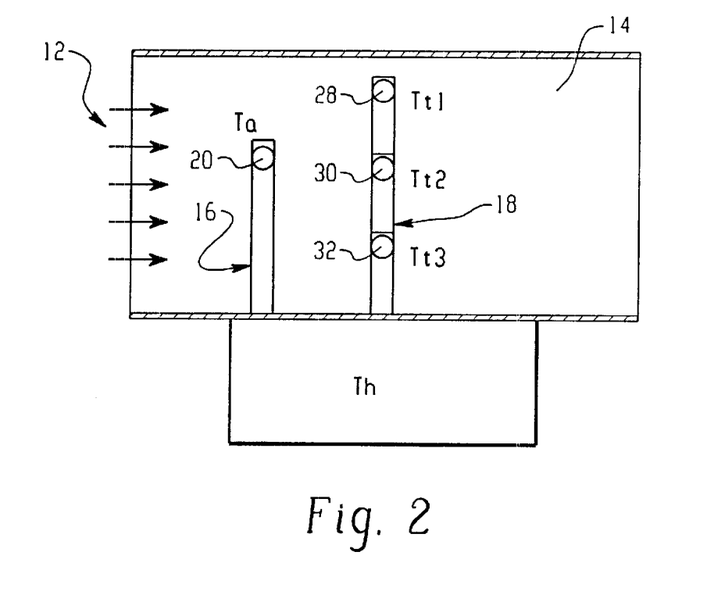
FIG. 2 is an illustration of yet another embodiment of the present invention.

While only one third thermocouple is shown in the embodiment of FIG. 1, it is understood that a plurality of third thermocouples may be disposed along the length of the second probe 18 for measuring an average temperature of the heated probe. For example, in the alternate embodiment of FIG. 2, three third thermocouples 28, 30 and 32 are disposed along the length of the second probe 18, one 28 at the tip, another 30 around the middle, and another 32 close to the bottom. The wires of the first thermocouple 20 may be passed through the probe 16 and coupled to the processor unit 22. In addition, the wires of the second and at least one third thermocouples 26 and 28 (30 and 32), respectively, may be passed through the second probe 18 and coupled to the processor unit 22.

Figure 3:
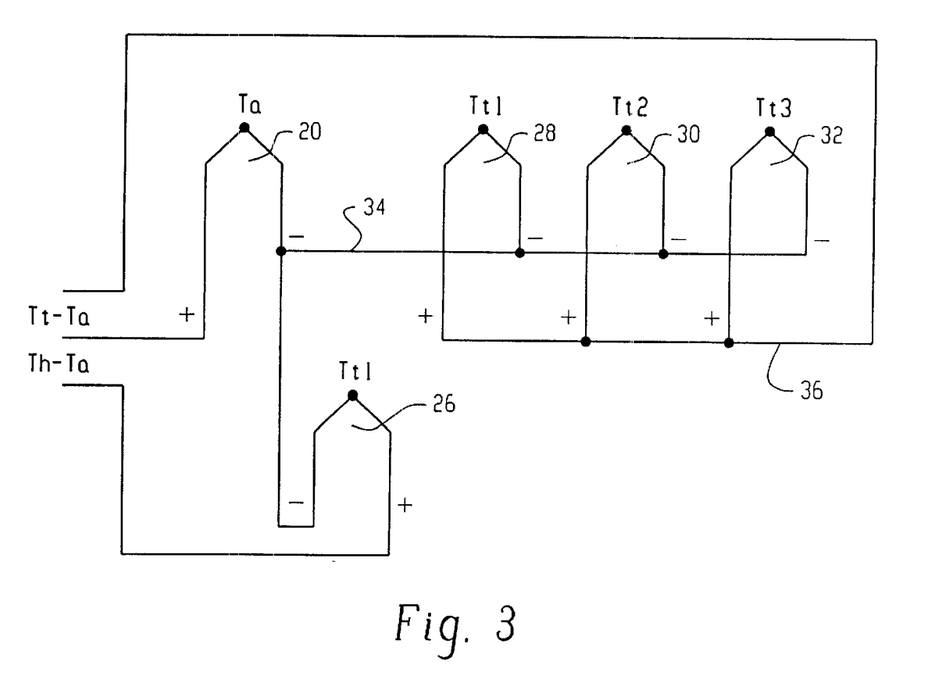
FIG. 3 is a circuit schematic exemplifying the coupling together of thermocouple temperature measuring devices suitable for use in an embodiment of the present invention.

The at least three thermocouples may be coupled together to generate at least two signals representative of temperature differentials in the vicinity of the probes 16 and 18. In the present embodiment, the coupling together of the thermocouples is exemplified schematically in FIG. 3. Referring to FIG. 3, thermocouples 20 and 26 are coupled by connecting their common (−) wires together. Accordingly, the voltage potential across the (+) wires thereof will be representative of the differential temperature Th−Ta. Also, if only one third thermocouple 28 is used, its (−) wire is connected to the (−) wire of the first thermocouple 20. Accordingly, the voltage potential generated across the (+) wires of the two thermocouples 20 and 28 will be representative of the differential temperature Tt−Ta. If a plurality of third thermocouples 28, 30 and 32 are used, then they may be coupled in parallel by connecting the (−) wires thereof together to form a node 34 and the (+) wires thereof together to form a node 36. In this example, the resulting node 34 of the (−) wire connections may be connected to the (−) wire of the thermocouple 20. Accordingly, the voltage potential generated across the (+) wire connection node 36 and the (+) wire of the thermocouple 20 will be representative of the differential temperature Tt(avg.)−Ta. As will become more evident from the following description, these two temperature differential signals will be used by the processor unit 22 to generate a signal representative of the mass flow.

The foregoing described embodiment operates on the principle of a stem conduction versus convection balance. The temperature of the heated probe 18 is monitored by thermocouple 26 at the point it is immersed in the media flow (Th) in the vicinity of the heater element 24 and is monitored by thermocouple 28 at the tip or some point along the length thereof, for example. As the media flow increases, the end of the probe 18 is cooled and this cooling effect is a measure of the mass flow. An equation used in most heat transfer text books for describing the phenomena is as follows:

$$Tt-Ta=(Th-Ta)/COSH((h*C/k*A)^{1/2}*L),$$

where h is the heat transfer coefficient of the heated probe in the path of the media flow, A is the cross-sectional area of the heated probe, C is the circumference of the heated probe, k is the thermal conductivity of the heated probe, and L is the distance between the thermocouples 26 and 28 (i.e. temperature measurements) along the length of the probe.

Figures 4, 5:
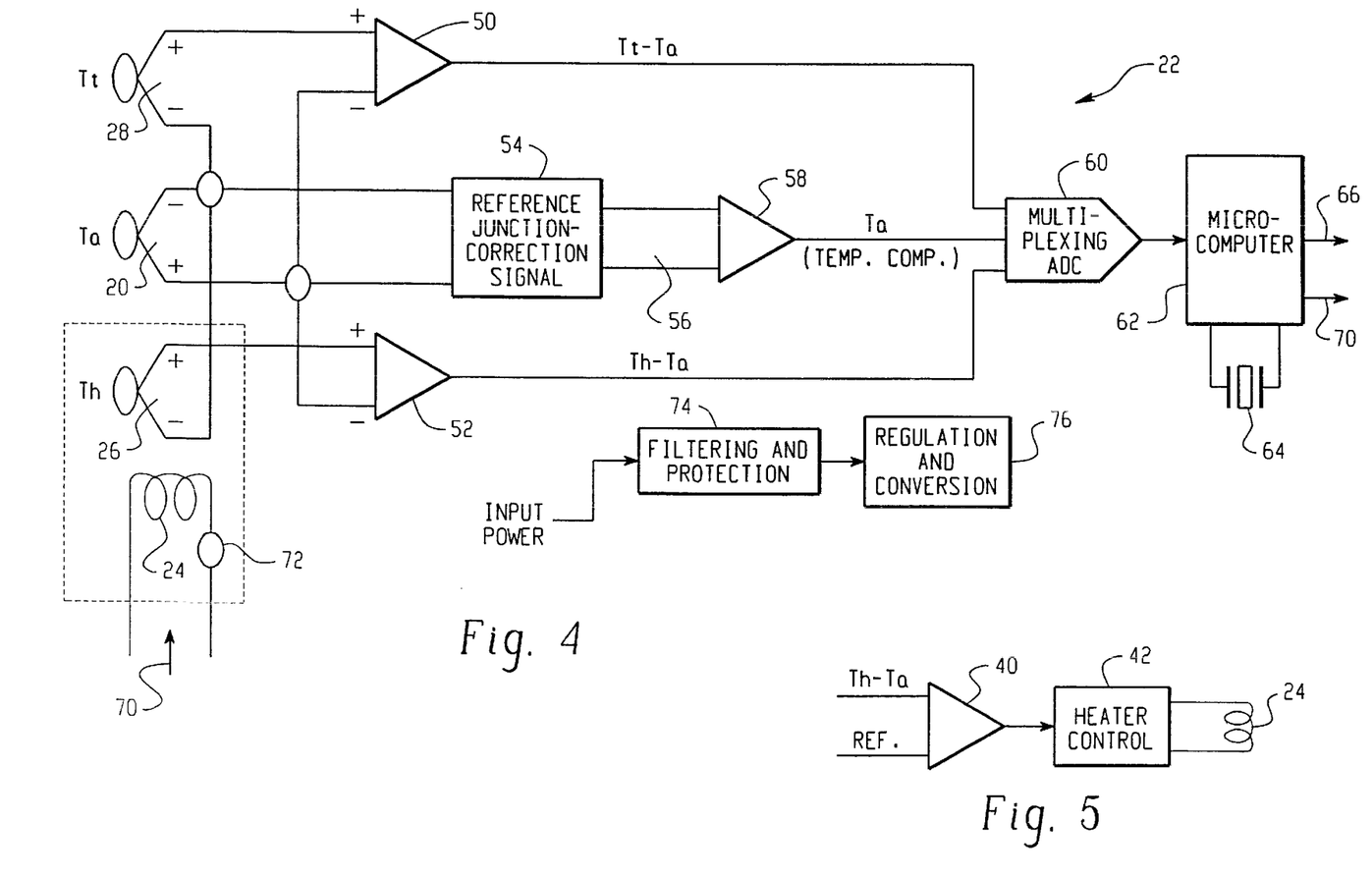
FIG. 4 is a block diagram schematic of a processing unit suitable for use in an embodiment of the present invention.
FIG. 5 is a block diagram schematic of a heater controller suitable for use in an embodiment of the present invention.

Since the measurements of the above equation are differential temperatures, this permits the at least three thermocouples to be connected together in opposition to generate the appropriate representative voltage differential signals. The heater element 24 may also be controlled by a heater control to maintain the temperature differential signal Th−Ta at a constant predetermined level, say 50 F, for example. That is, the temperature of the probe at the heating element 24 is maintained at a predetermined differential above the ambient temperature of the mass flow. A suitable embodiment for this aspect is exemplified in the block diagram schematic of FIG. 5. Referring to FIG. 5, the differential temperature signal Th−Ta is coupled to one input of a differential amplifier 40 and the other input is coupled to a setable reference signal Ref representative of the desired temperature differential to be maintained. The amplifier 40 governs a conventional heater control circuit 42 to supply sufficient current to the heating element 24 to maintain the desired temperature differential Th−Ta. In operation, if the ambient temperature Ta drops, the amplifier responds by decreasing the current to the heating element 24 to lower the temperature Th to maintain the desired temperature differential set by the signal Ref. Likewise, if Ta increases, the amplifier 40 governs the control unit 42 to increase the current through the element 24 to increase Th and maintain the desired temperature differential.

Figure 6:
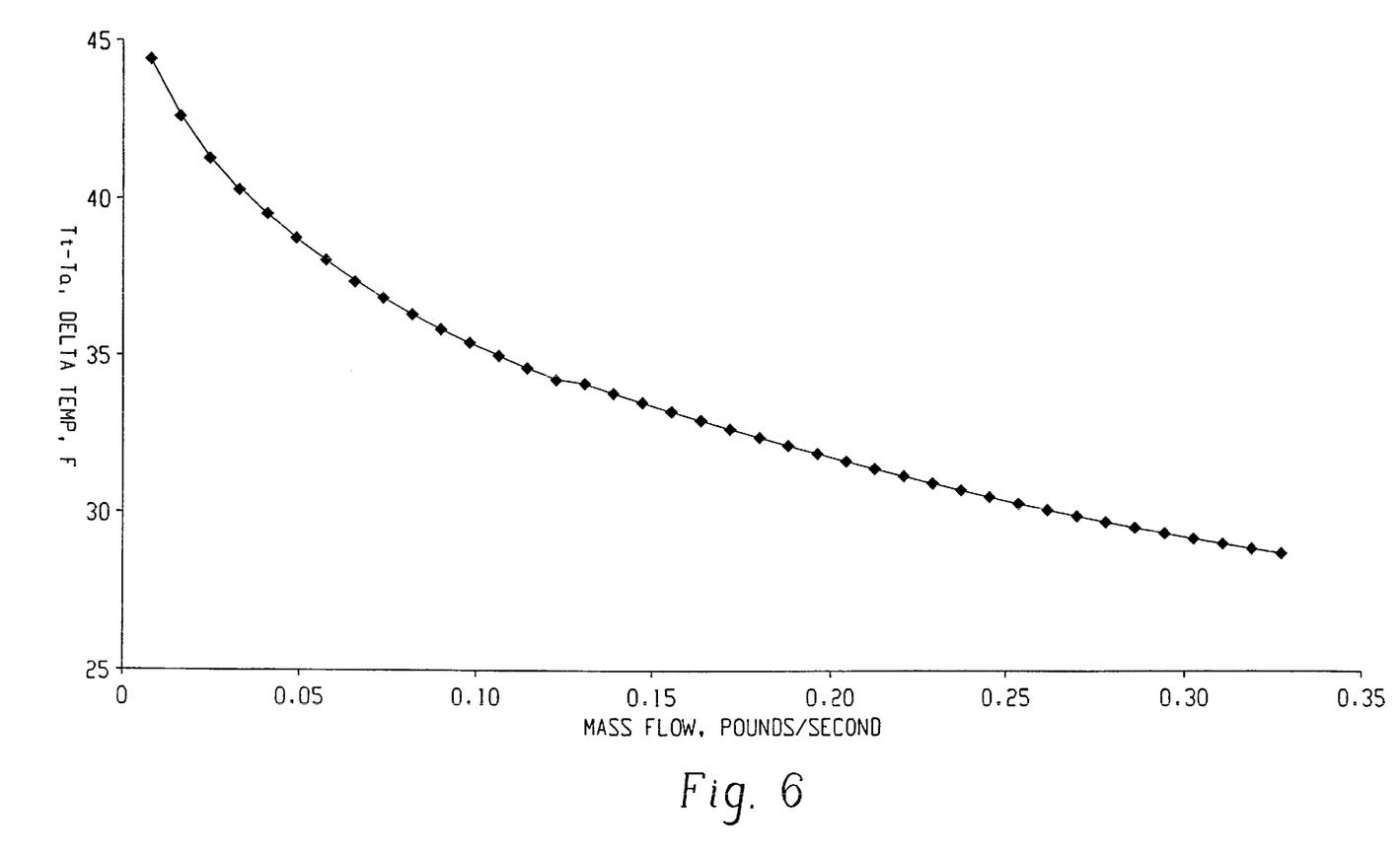
FIG. 6 is a graph exemplifying test results of an embodiment of the present invention.

Note that in the above equation, if Th−Ta is maintained at a constant value and all other variables are constant except h and Tt, then Tt−Ta is dependent on h. Therefore, the mass flow may be represented by the differential temperature signal Tt−Ta. Experimental results of this phenomenon is shown in the graph of FIG. 6 for a constant temperature differential Th−Ta of 50 F, a heated probe of stainless steel one inch long with a cross-sectional diameter dimension of 0.1 inch. Alternatively, a ratio of the differential signals $(T_h-T_2)a)/(T_t-Ta_2))$ may be used to determine mass flow without governing the heat to the heating element 24 based on a temperature measurement.

A suitable embodiment of the processing unit 22 is shown in the block diagram schematic of FIG. 4. Referring to FIG. 4, the (+) wires of thermocouples 20 and 28 are coupled to inputs of a differential amplifier 50 for amplifying the differential voltage potential representative of Tt−Ta. In addition, the (+) wires of the thermocouples 26 and 20 are coupled to inputs of another differential amplifier 52 for amplifying the differential voltage potential representative of Th−Ta. Still further, the (+) and (−) wires of the thermocouple 20 are coupled to a conventional reference junction correction circuit 54, the differential output signal 56 thereof being coupled to another differential amplifier 58 for amplification. The amplified output signal of amplifier 58 is representative of a temperature compensated measurement Ta. The amplified signals Th−Ta, Ta, and Tt−Ta are input to a conventional multiplexing analog-to-digital (A/D) converter circuit 60 for digitization thereof. The multiplexing A/D 60 may be of the type manufactured by Analog Devices, bearing model number AD7731, for example. The digitized signals are supplied to a micro-computer 62 with a clock rate controlled by a crystal 64. The micro-computer 62 which may be of the type manufactured by Dallas Semiconductor, bearing model number 87C511, for example, is programmed to process the digitized signals to generate a mass flow representative signal 66 which will be more evident from the description found herein below. The heater control embodiment described in connection with FIG. 5 may be implemented in software for execution by the micro-computer 62 for generating a current signal 70, albeit amplified, for heating the heating element 24 which may include a thermal over temperature cutoff 72, for example. The differential amplifiers of the present embodiment may be of the operational amplifier type manufactured by Analog Devices, bearing model number OP77, for example. Power may be supplied to the various circuits of the unit 22 through a conventional filtering and protection circuit 74. If the input power is unregulated, then an additional regulation and conversion circuit 76 may be used for the regulation of the input power before supplying to the various circuits of the unit 22.

Figure 7A:
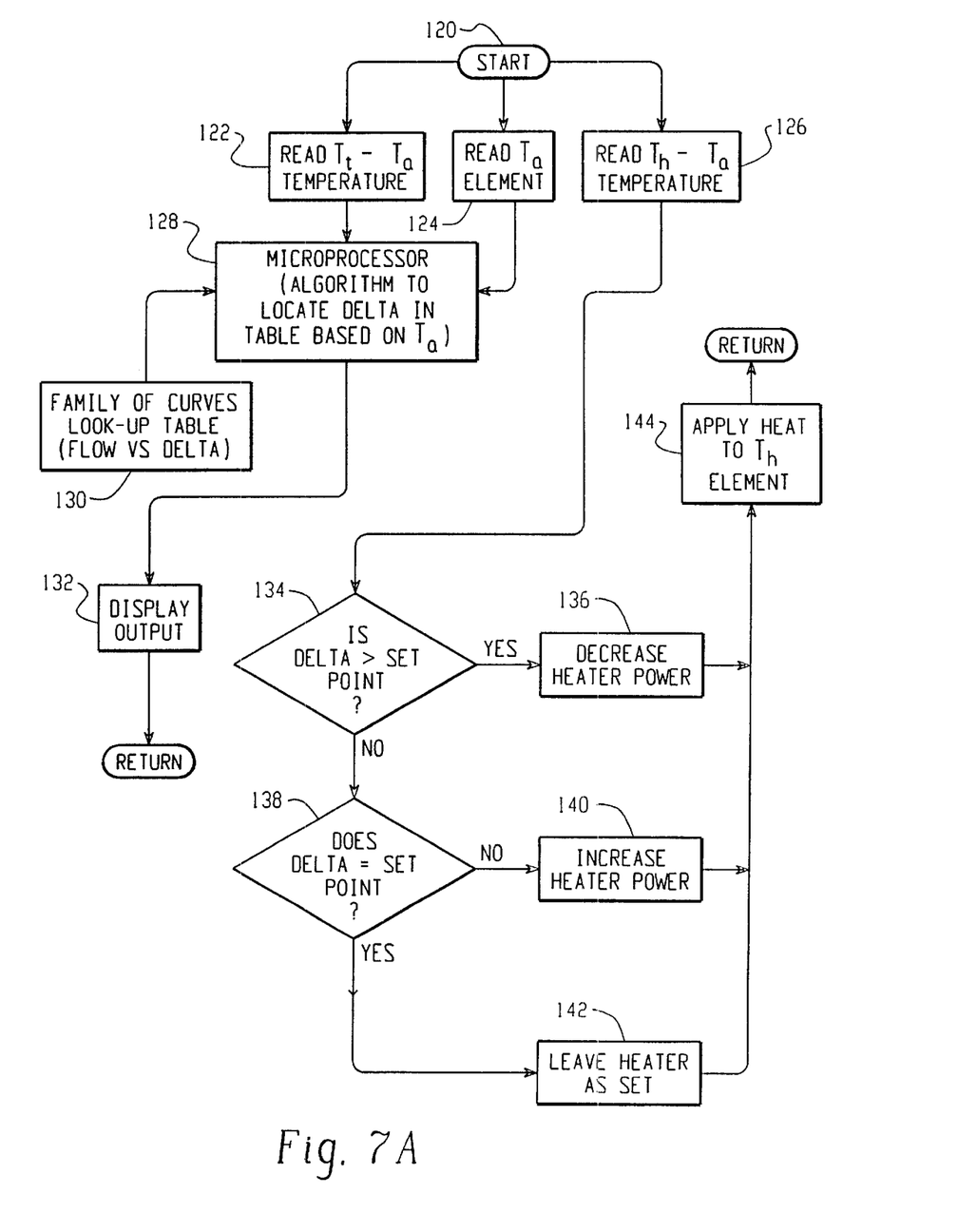
FIGS. 7A and 7B are software flowcharts suitable for use in programming the micro-controller of the embodiment of FIG. 4.

A simplified flowchart exemplifying the programmed operation of the micro-computer 62 in processing the digitized temperature signals to generate the mass flow signal 66 is shown in FIG. 7A for one embodiment of the present invention. The program depicted in FIG. 7A may be executed periodically or as needed in the microcontroller 62. Referring to FIG. 7A, program execution begins at block 120 which initiates the reading of the various temperature measurement signals utilizing the multiplexing A/D converter 60 (refer to FIG. 4). In blocks 122, 124 and 126, the temperature signals $T_t-T_a$, $T_a$, and $T_h-T_a$, respectively, are read into the microcomputer 62 via the A/D 60 and may be stored in designated memory locations thereof. Thereafter, in block 128, an algorithm is executed which reads the designated memory location of $T_a$ and selects the corresponding curve from a family of flow vs. delta temperature curves in block 130 based on the current value of $T_a$. Each curve of the family of curves in block 130 are represented by look-up tables in the present embodiment. The family of look-up tables may be stored in a memory of the microcomputer 62, for example. It is understood, however, that other formats may be used to represent each such curve, like computing the curve as a polynomial or an algebraic expression, for example. In any event, once the appropriate look-up table is selected, the designated memory location $T_t-T_a$ $T_a$ is read and the corresponding mass flow is determined from the look-up table based on the current value of $T_t-T_a$. Well-known interpolation techniques may be used for temperature values of $T_a$ between those selected for the family of curves and for mass flows between discrete values of $T_t-T_a$, for example. The resulting mass flow may be output from the microcontroller 62 over signal line 66 to a display, for example, in block 132.

Another part of the program begins at block 134 wherein the designated memory location of $T_h-T_a$ is read and compared with a predetermined set point. If the delta temperature is greater than the set point, the power setting to the heater element 24 (refer to FIG. 4) is decremented a predetermined amount in block 136. Otherwise, in decisional block 138, the delta temperature is again compared with the set point to determine if it is equal to the set point. If not, the power setting to the heater element 24 is incremented a predetermined amount in block 140. Otherwise, the heater setting is left as set in block 142. Next, block 144 governs the power to the heater element 24 via power line 70 in accordance with the settings of blocks 136, 140 and 142. A power amplifier may be utilized to effect the appropriate power to the heating element 24 based on the level of the signal 70. In this manner, the differential temperature $T_h-T_a$ is maintained substantially constant at the predetermined set point during the determination of mass flow. After executing blocks 132 and 144, program execution is returned to an executive program to wait for the next execution thereof.

Figure 7B:
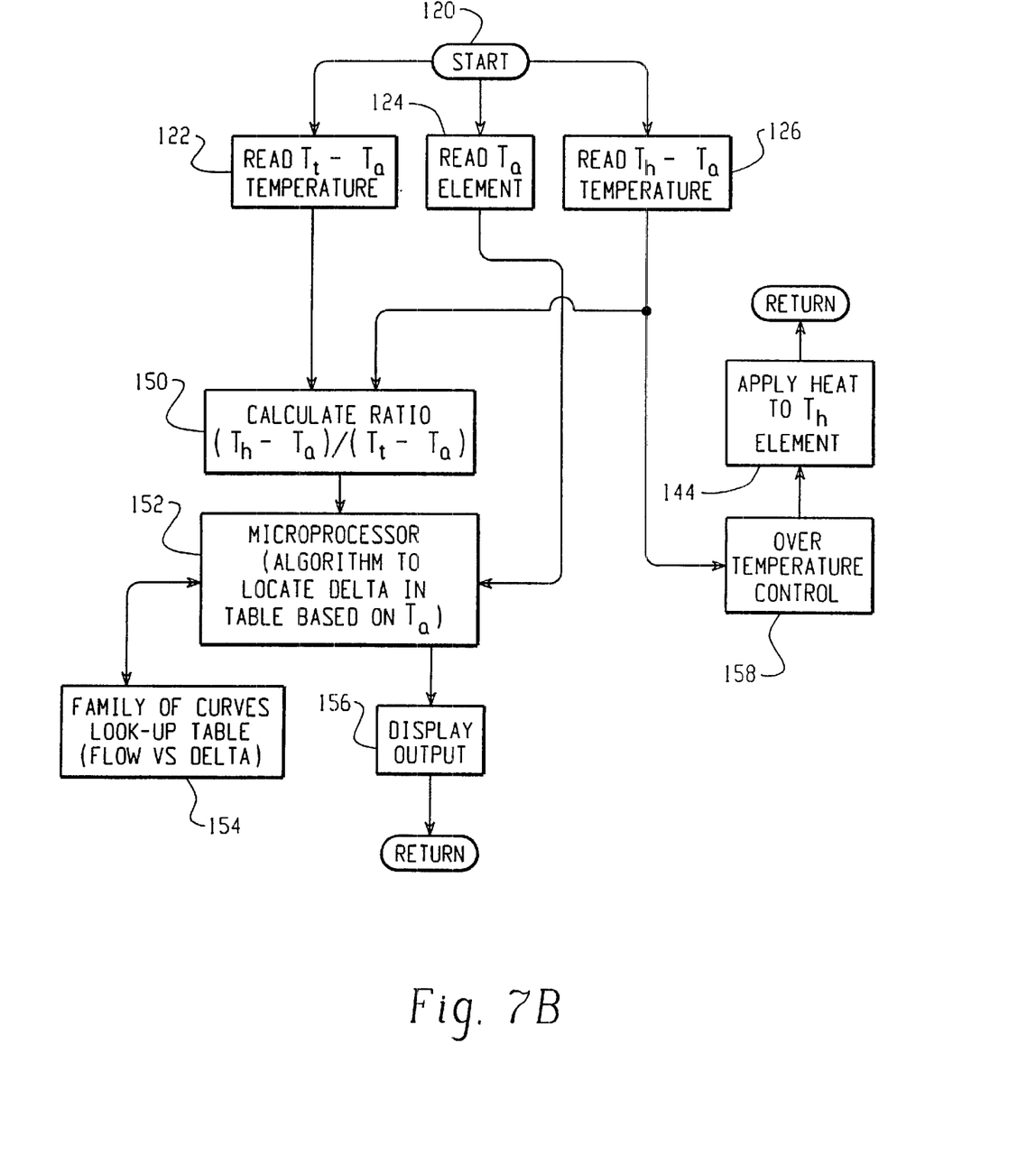

Another flowchart exemplifying the programmed operation of the micro-computer 62 in processing the digitized temperature signals to generate the mass flow signal 66 is shown in FIG. 7B for an alternate embodiment of the present invention. The instructional blocks 120, 122, 124 and 126 may remain as described for the embodiment of FIG. 7A. Referring to FIG. 7B, the designated memory locations of $T_h-T_a$ and $T_t-T_a$ are read and a ratio thereof calculated in block 150. Thereafter, in block 152, an algorithm is executed which reads the designated memory location of $T_a$ and selects the corresponding curve from a family of mass flow vs. delta temperature ratio curves in block 154 based on the current value of $T_a$. Each curve of the family of curves in block 154 is represented by a look-up table in the present embodiment. These look-up tables may be stored in a memory of the micro-computer 62, for example. It is understood, however, that other formats may be used to represent such curves, like computing the curve as a polynomial or an algebraic expression, for example. In any event, once the appropriate look-up table is selected, the mass flow is determined from the look-up table based on the current value of the calculated ratio of delta temperatures. Well-known interpolation techniques may be used for temperature values of $T_a$ between those selected for the family of curves and for mass flows between discrete values of the calculated delta temperature ratios, for example. The resulting mass flow may be output from the microcontroller 62 over signal line 66 to a display, for example, in block 156.

Still referring to FIG. 7B, in block 158, an over temperature control algorithm is performed in which the current differential temperature $T_h-T_a$ is compared to a predetermined differential temperature limit. If the temperature limit is exceeded, then the power output from block 144 is decremented by a predetermined amount or brought to zero until the differential temperature is brought back below the temperature limit. In this manner, the power level to the heating element 24 is maintained substantially constant provided the heating element temperature $T_h$ does not exceed the current ambient temperature $T_a$ by a predetermined limit. After executing blocks 156 and 144, program execution is returned to an executive program to wait for the next execution thereof.

Figure 1A:
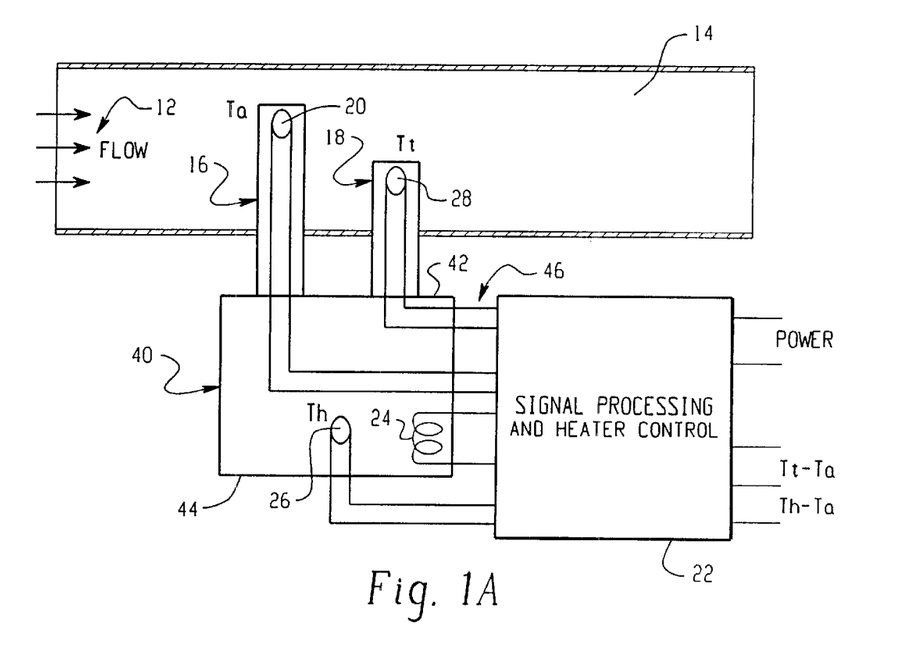
FIG. 1A is a block diagram schematic of an alternate embodiment of a mass flow sensor suitable for embodying the principles of the present invention.

An alternate embodiment of the present invention is illustrated in the sketch of FIG. 1A. In this embodiment, the two probes 16 and 18 are coupled to a heat sink 40 which may be comprised of a heat conducting metal, like copper, for example. The heat sink 40 may be cylindrical in shape having a diameter, preferably in the range of approximately ¼ to 5/16 of an inch, for example. Holes may be provided in the top 42 and through the heat sink 40 to accommodate the probes 16 and 18 which may be integrated thermocouple units having a sheath of stainless steel of an outside diameter of approximately 0.04 inches, for example. A third hole may be provided at the bottom 44 of the heat sink 40 and extending almost to the top 42 to accommodate another thermocouple probe unit containing the thermocouple 26 which may also be stainless steel with an outside diameter of approximately 0.04 inches, for example.

In this embodiment, since the two thermocouple probes 16 and 18 are coupled to the heat sink 40 which is the source of heating, then the probe 16 with the thermocouple junction 20 at its tip should be substantially longer than the probe 18 in order to provide distance between the thermocouple 20 and the heating source so that it may not be influenced thereby. In one embodiment, the probe 16 may protrude from an entry side through the path of the mass flow almost to the other side of the cross flow tube 14. In some cases, the probe 16 is bent around at the other side of the tube 14 to extend back to the entry side, especially if the tube diameter is relatively small, to create distance between the heating source and thermocouple junction 20. On the other hand, the probe 18 which is intended to be heated by the heating source 40 may be relatively shorter in length compared with the length of the probe 16.

Returning to FIG. 1A, a fourth hole is provided in the heat sink 40 for accommodating the heating element 24 which may be for the present embodiment a platinum resistance device, for example The fourth hole may extend into the heat sink 40 approximately 0.6 inches. The four holes may be evenly spaced around the diameter of the unit 40. Also, the thermocouple probes may be affixed to the heat sink 40 by silver brazing, for example. Wires 46 from the thermocouple units 20, 26 and 28 and the heating element 24 are coupled to a connector in the processing unit 22. The thermocouples may be interconnected in the same or a similar manner to that described in connection with the embodiment of FIG. 3 to generate the two differential signals $T_h-T_a$ and $T_t-T_a$. In addition, the processing unit 22 may be the same or similar to the embodiment described in connection with FIGS. 4, for example.

While the foregoing described embodiments have been described using thermocouples, it is understood that any temperature measuring device may be used for measuring the temperature of the probe along the length thereof and the temperature of the mass flow, like resistance temperature devices (RTDs), thermisters and the like, for example. Note that when using these other type temperature measuring devices, they are not intended to be self-heated. While unlike thermocouples, signal current may be conducted through these alternative temperature measuring devices for obtaining temperature measurements therefrom. But, it is well understood that these signal currents are not of the level to create substantial self-heating as occurring in the prior art devices. A suitable embodiment of a processor unit 22 for accommodating temperature measuring devices of the RTD variety is shown in the circuit schematic diagram of FIG. 8.

Figure 8:
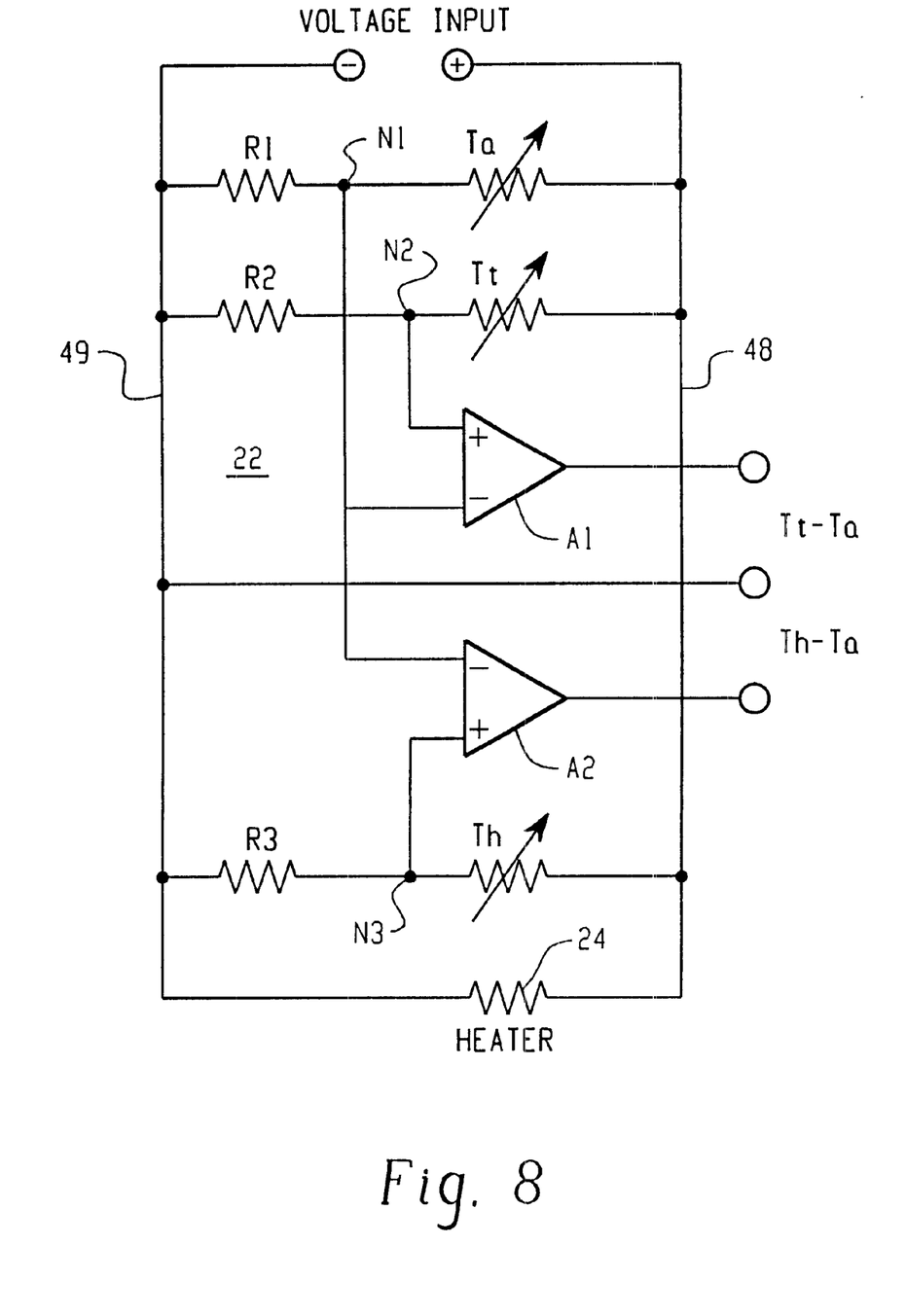
FIG. 8 is a schematic of a circuit for use in accommodating temperature measuring devices of the RTD type in an embodiment of the present invention.

Referring to FIG. 8, a reference voltage potential is applied across the rails or nodes 48 and 49, the positive potential applied to rail 48 and the negative potential applied to rail 49. A resistance divider network comprising resistor R1 and an RTD ($T_a$) is coupled across the rails 48 and 49 and the interconnecting resistance node N1 is coupled to negative inputs of differential amplifiers A1 and A2. Another resistance divider network comprising resistor R2 and an RTD ($T_t$) is coupled across the rails 48 and 49 with the resistance node N2 coupled to a positive input of the differential amplifier A1. Yet another resistance divider network comprising resistor R3 and an RTD ($T_h$) is coupled across the rails 48 and 49 with the resistance node N3 coupled to a positive input of the amplifier A2. Amplifier A1 generates the temperature differential signal $T_t-T_a$ from the voltages of the nodes N1 and N2 and amplifier A2 generates the temperature differential signal $T_h-T_a$ from the voltages of the nodes N1 and N3. The heater element 24 may also be couple across the rails 48 and 49 for providing heating current thereto as described herein above. It is understood that when the temperature differential signal $T_h-T_a$ is to be maintained at a predetermined fixed level, then a more sophisticated control circuit may be needed, like the one described in connection with the embodiment of FIG. 5, for example.

Figure 9:
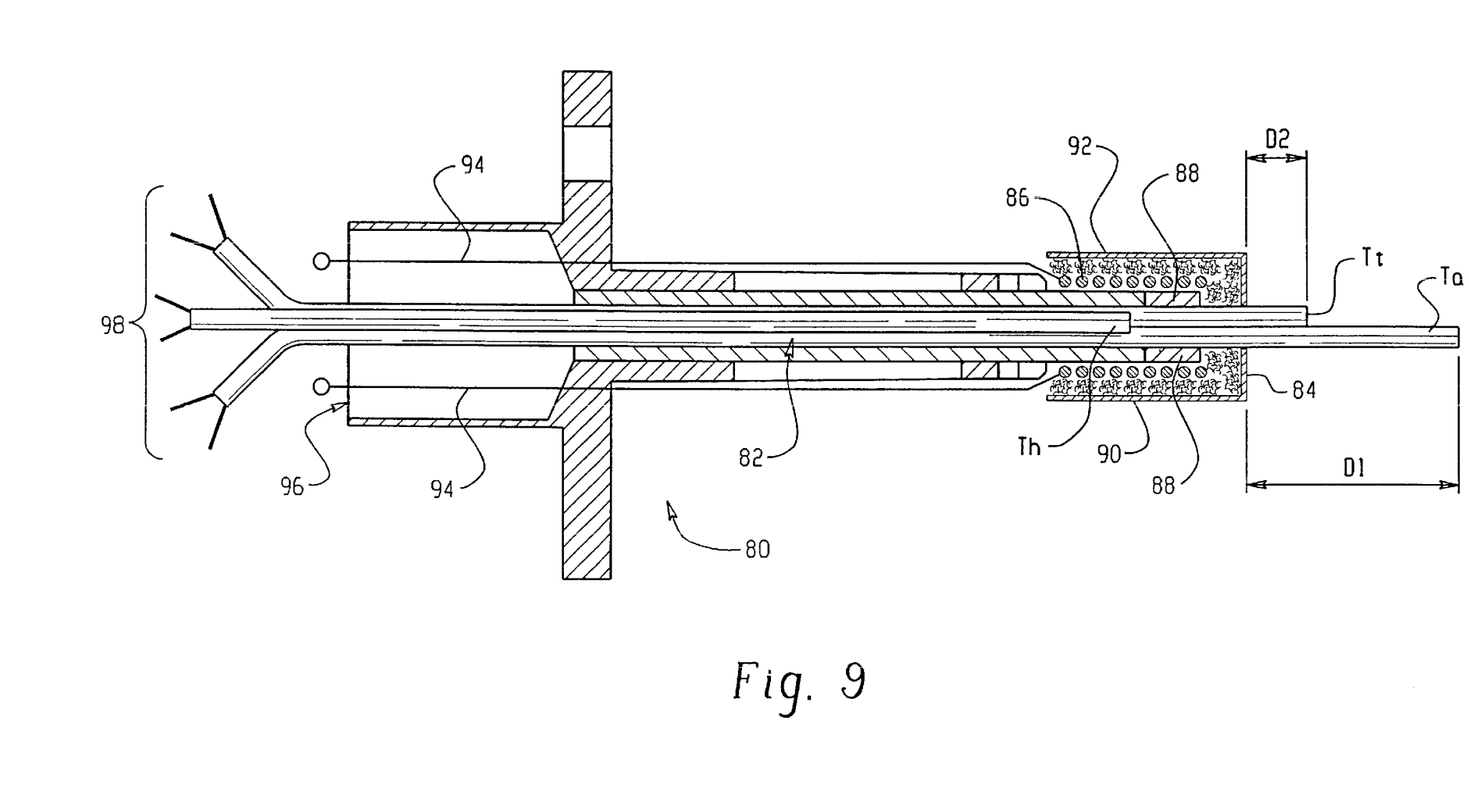
FIG. 9 is a cross-sectional illustration of a single probe mass flow sensor suitable for use in an embodiment of the present invention.

In yet another embodiment, a single probe or unit 80 for disposition into the mass flow 12 of the cross flow tube 14 is shown by the cross-sectional, cut-away sketch of FIG. 9. The three thermocouple probes $T_h$, $T_a$, and $T_t$ are disposed into the single probe unit 80 through a central opening 82. All of the thermocouples may be of the K type with an ungrounded junction, an outer stainless steel sheath with a diameter of approximately 0.06 inches, and minerally insulated, for example. The $T_a$ thermocouple junction may extend beyond the top 84 of the unit 80 a distance D1 which may be approximately 0.7 inches, for example, to measure the temperature of the mass flow 12. In addition, the $T_t$ thermocouple junction may extend beyond the top 84 a distance D2 which is to a lesser extent than the junction of thermocouple $T_a$, say on the order of 0.25 inches, for example, to measure its own stem conduction temperature in the path of mass flow. A Minco laminated heater 86 which may be of the type bearing model number HK516R78.4L12A, for example, is wound around the stems of the thermocouples near the top 84 of the unit 80 and held in place with tape, for example. The junction of the thermocouple $T_h$ is disposed within a heat sink 88 located at an end of opening 82 in the vicinity of the heater element 86 to measure the temperature of the thermocouple stems $T_t$, which also passes through the heat sink 88, and $T_h$ at or near the point of heating. A metal shield 90 is placed over the heater coils 86 with a gap 92 therebetween filled with a fiberglass insulation, for example, to reduce heat loss (and, therefore, power consumption) to the mass flow. All three thermocouples are brazed into the heat sink at 88 which acts as a heated support for the $T_h$, $T_a$ and $T_t$ thermocouples and ensures a uniform temperature at the base of the protruding probes as desired by the physical principles of the particular design. The junctions of the $T_a$ and $T_t$ thermocouples may be oriented such that a line through their axis is substantially perpendicular to the mass flow 12.

Heater wires 94 extend from the heater element position through the probe 80 and out of an opening 96 at the bottom thereof. The wires 98 of the three thermocouples are also passed out of the unit 80 from the opening 96. The wires 94 and 98 may be coupled to a processing unit similar to the unit 22 described in connection with the embodiment of FIG. 4. If a heater controller is deemed appropriate, it may be embodied in the software of micro-computer 62 as described in connection with the program flowcharts of FIGS. 7A and 7B, or in the alternative, a controller similar to the one described in connection with FIG. 5, for example. The embodiment described in connection with the program flowcharts of FIGS. 7A or 7B may process the thermocouple signals and either utilize the differential temperature $T_t-T_a$ or the ratio $(T_h-T_a)/(T_t-T_a)$ of differential temperatures for determining the mass flow output. The ratio output representative of mass flow results in a more stable output than that of the difference $(T_t-T_a)$ as the output. Because of the relationship of all the temperatures involved, the ratio output is relatively insensitive to the values of $T_h$ and $T_a$, and thus, the heater temperature does not have to be controlled to maintain a fixed temperature difference $T_h-T_a$ and the ambient temperature correction is inherent. The ratio output will provide nearly the same mass flow output independent of heater temperature and ambient temperature. This embodiment has the advantage of being used in applications where the duct wall temperature is always different than the fluid temperature. Thus, for this embodiment, a built in heater is not needed. However, a higher heater temperature will provide a more stable output since the greater temperature differences provide thermocouple voltage outputs with higher signal/noise.

While the embodiment of FIG. 9 is described with thermocouples as temperature measuring devices, it is understood that other temperature measuring devices may be utilized just as well, like resistance temperature devices (RTDs), thermisters, and the like, for example. As has been described above, these alternative temperature measuring devices are not intended to be self-heated. Thus, any currents conducted therethrough will be at the signal current level for obtaining a temperature measurement signal, if appropriate, as described in connection with the embodiment of FIG. 8, for example.

An experimental test was run on the embodiment of FIG. 9 with the Tt thermocouple junction disposed on the upstream side of the mass flow in relation to the junction of the Ta thermocouple, and then with it on the downstream side of thermocouple Ta. In this experiment, the wires 98 were connected together to provide the temperature differential signals which were coupled to a ratioing voltmeter to provide direct output readings representative of mass flow which are exemplified in the graph of FIG. 10. The first configuration gave a higher output as shown by the line 100 in the graph of FIG. 10, but the sensitivity flattened out. The second configuration gave an almost linear output, albeit lower in magnitude, across the range as shown by the line 102 and appears to be a better design configuration for the single unit or probe type. Data taken in this second configuration is exemplified in the graph of FIG. 11 which illustrates a good sensitivity and good repeatability of the ratio output to mass flow.

Figure 10:
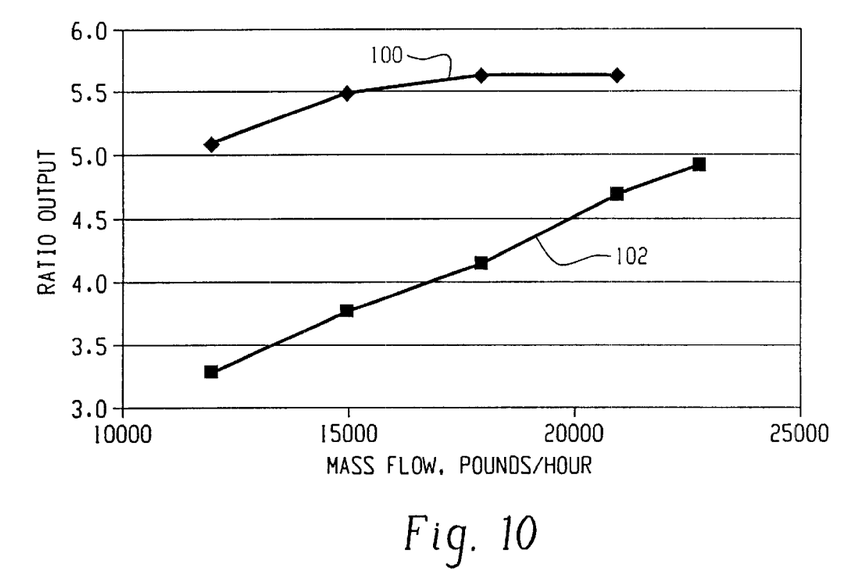
FIG. 10 is a another graph exemplifying test results of an embodiment of the present invention.
Figure 11:
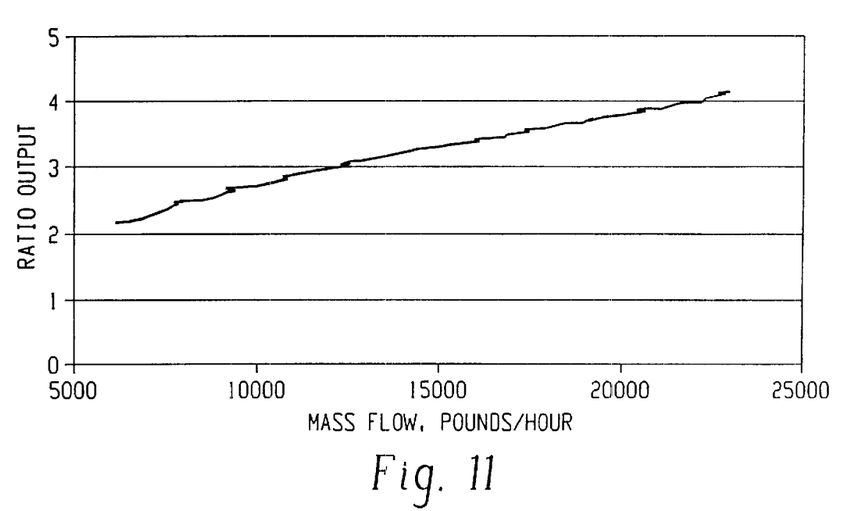
FIG. 11 is yet another graph exemplifying test results of an embodiment of the present invention.

In some applications, it is important to indicate the direction of mass flow. An added benefit of the present embodiment may be derived from the disposition of thermocouple junctions $T_t$ and $T_a$ in the flow duct or piping with regard to the direction of mass flow as revealed by the graph of FIG. 10. The graph of FIG. 10 shows clearly a mutually exclusive ratio magnitude range for each direction of mass flow. It is evident from this characteristic that if mass flow changes direction, the magnitude of the ratio of temperature differentials will change accordingly. Thus, once the temperature differential ratio is calculated, like in block 150 of the flowchart of FIG. 7B, for example, the calculated ratio magnitude may be conditioned and compared with two pre-calibrated ratio magnitude ranges. Accordingly, with proper calibration, the direction of mass flow may be determined and indicated based on which magnitude range the calculated ratio falls within. In addition, mass flow may be determined in either direction by having two sets of curve families in block 154. For example, once the flow direction is determined by the ratio magnitude, the proper curve may be selected from block 154 and the mass flow determined therefrom. In this manner, the micro-controller 62 may output the measured mass flow and indicate the flow direction thereof.

Figure 12A:
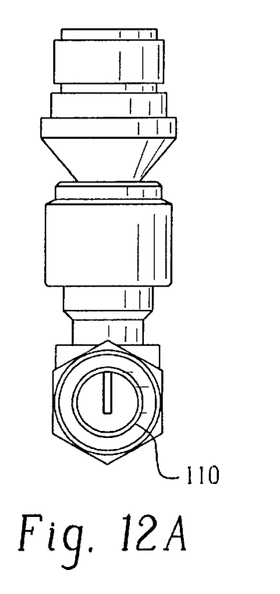
FIGS. 12A and 12B illustrate views of yet another embodiment of the present invention.
Figure 12B:
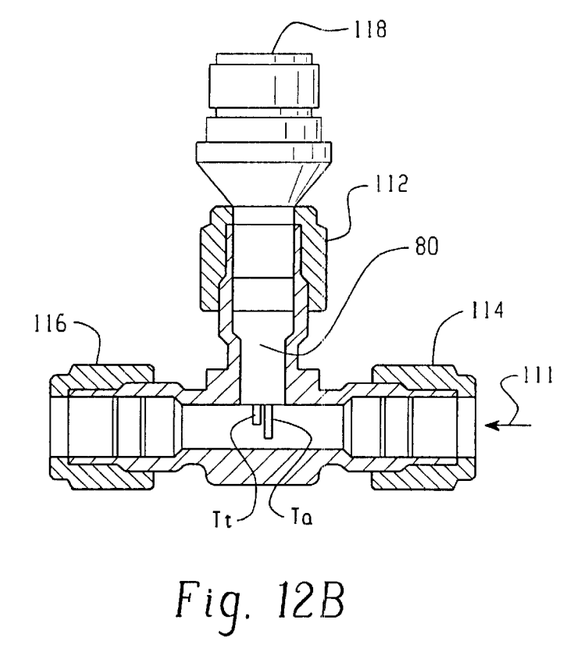
Figure 13:
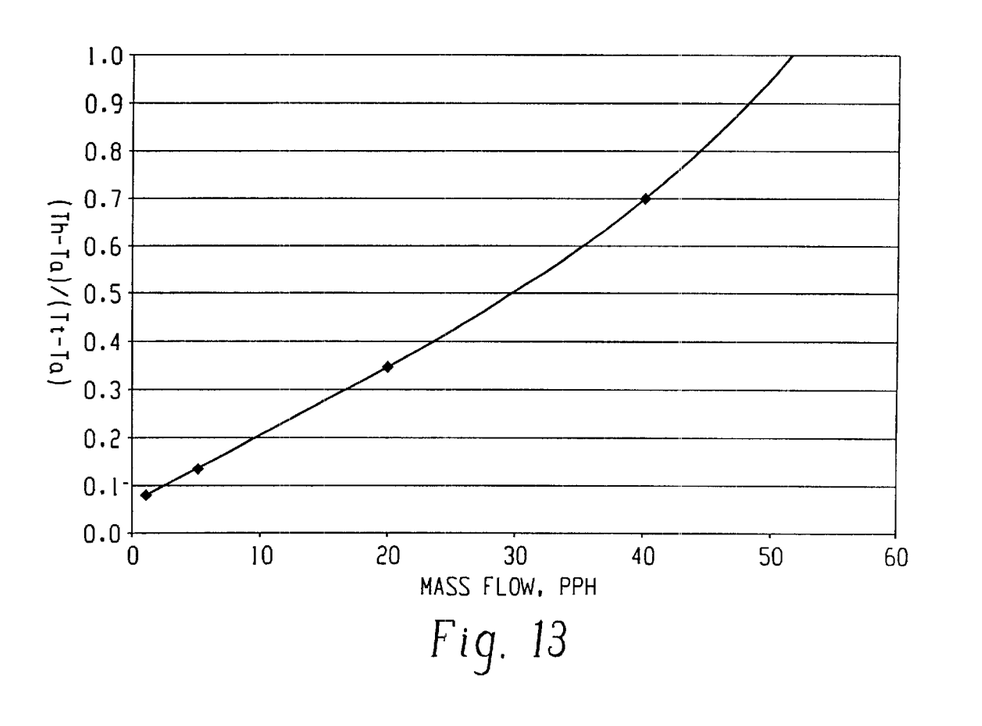
FIG. 13 is yet another graph exemplifying test results of an embodiment of the present invention.

An exemplary embodiment of the present invention as applied to a gas flow pipeline to measure natural gas flow in pounds/hour is shown in two views in FIGS. 12A and 12B. This embodiment includes a miniaturized version of the probe 80 described in connection with FIG. 9. In this embodiment, a modified T-type compression tube fitting 110, which may be of the type manufactured by Swagelok bearing part no. SS-T-600-3, for example, is disposed in the path of mass flow 111 and contains the miniaturized probe 80 which is sealed in one leg 112 thereof such that the sensing thermocouple junctions $T_t$ and $T_a$ of probe 80 are immersed in the path of mass flow 111 passing through the tube fitting 110 via legs 114 and 116. In the present embodiment, the miniaturized probe 80 is comprised of three 0.04 inch 20 diameter thermocouples of the K or E type, for example, brazed into a copper heat sink as previously described in connection with FIG. 9. The heater for this miniaturized embodiment may be a 100 ohm platinum resistance sensor that is embedded in the heat sink with a thermally conductive potting material. The heat sink is held in a teflon cup to help isolate it from the probe body and mass flow. The thermocouple and heater wires (not shown) are coupled to pins of a connector 118 which is coupled to an end of probe 80 exiting the leg 112 of the tube fitting 110. Exemplary test data for this embodiment comparing the ratio $(T_h-T_a)/(T_t-T_a)$ to the mass flow is shown in the graph of FIG. 13.

While the present invention has been described in connection with various embodiments herein above, it is understood that it should not be limited in any way, shape or form to any such embodiments which are provided merely by way of example. Rather, the present invention should be construed in breadth and broad scope in accordance with the recitation of the claims appended hereto.

What is claimed is:

1. A mass flow sensor comprising:

a probe having a predetermined length for disposition in the path of mass flow;

means for heating said probe;

at least two first temperature measuring devices disposed at different points along said length for measuring temperatures $T_t$ and $T_h$ of said heated probe at said points in the presence of the mass flow;

a second temperature measuring device for disposition in the path of mass flow for measuring the temperature $T_a$ of the mass flow; and means coupled to said first and second temperature measuring devices for determining differential temperature measurements $T_h-T_a$ and $T_t-T_a$ and for generating a mass flow signal based on a ratio of said differential temperature measurements $(T_h-T_a)/(T_t-T_a)$.

2. The mass flow sensor of claim 1 wherein the heating means includes a heat sink coupled to the bottom of the probe for heat transfer from the heat sink to the probe; and a heating element disposed at said heat sink for heating the heat sink and probe.

3. The mass flow sensor of claim 2 wherein the heat sink and heat element are isolated from the mass flow.

4. The mass flow sensor of claim 2 wherein one first temperature measuring device is disposed at the heat sink for measuring temperature $T_h$.

5. The mass flow of claim 1 wherein the first temperature measuring devices include one first temperature measuring device disposed in the vicinity of the bottom of the probe for measuring temperature $T_h$ and another first temperature measuring device disposed at the tip of the probe for measuring temperature $T_t$.

6. The mass flow sensor of claim 1 wherein the first temperature measuring devices include a multiplicity of first temperature measuring devices disposed at corresponding points along the length of the probe for measuring probe temperatures at said points.

7. The mass flow sensor of claim 1 including a second probe having a predetermined length for disposition in the path of mass flow upstream of the heated probe; and wherein the second temperature measuring device is disposed at a point along the length of said second probe.

8. The mass flow sensor of claim 7 wherein the heating means includes a heat sink coupled to the bottoms of the heated and second probes; a heating element disposed at said heat sink for heating the heat sink and heated probe; and wherein the length of the second probe is greater than the length of the heated probe.

9. The mass flow sensor of claim 1 wherein the first temperature measuring devices comprise thermocouples.

10. The mass flow sensor of claim 9 wherein the thermocouples and the probe are an integrated unit.

11. The mass flow sensor of claim 1 wherein the first temperature measuring devices comprise resistance temperature devices (RTDs).

12. The mass flow sensor of claim 1 wherein the first temperature measuring device measuring $T_t$ and the second temperature measuring device measuring $T_a$ are disposed apart from each other in the path of mass flow such that in one direction of mass flow, the $T_t$ measuring device is downstream of the $T_a$ measuring device and in the other direction of mass flow, the $T_a$ measuring device is downstream of the $T_t$ measuring device; and wherein the determining means determines the direction of mass flow based on the ratio of the temperature differential signals $(T_h-T_a)/(T_t-T_a)$.

13. A method of measuring mass flow comprising the steps of:

disposing a probe of a predetermined length in the path of mass flow;

heating said probe;

measuring the heated probe temperature at at least two different points along its length in the presence of the mass flow to provide at least temperature measurements of $T_h$ and $T_t$ at said points;

measuring the temperature $T_a$ of the mass flow;

determining differential temperature measurements $T_h-T_a$ and $T_t-T_a$; and determining mass flow as a ratio of said differential temperature measurements $(T_h-T_a)/(T_t-T_a)$.

14. The method of claim 13 including the steps of heating a heat sink; and transferring heat from the heat sink to the probe.

15. The method of claim 14 including the step of isolating the heat sink from the mass flow.

16. The method of claim 14 including the step of measuring temperature $T_h$ at the heat sink.

17. The method of claim 13 wherein the step of measuring the temperature of the heated probe includes measuring temperature $T_h$ in the vicinity of the bottom of the probe and measuring temperature $T_t$ at the tip of the probe.

18. The method of claim 13 wherein the step of measuring the temperature of the heated probe includes measuring temperatures at a multiplicity of points along the length of the probe.

19. The method of claim 13 including the steps of disposing a second probe of a predetermined length in the path of mass flow upstream of the heated probe; and measuring temperature of the mass flow at a point along the length of said second probe.

20. The method of claim 13 wherein the temperatures of the heated probe are measured with devices comprising thermocouples.

21. The method of claim 13 wherein the temperatures of the heated probe are measured with devices comprising resistance temperature devices (RTDs).

22. The method of claim 13 including the steps of: measuring the temperature $T_t$ downstream of measuring the temperature $T_a$ in one direction of mass flow; measuring the temperature $T_a$ downstream of measuring the temperature $T_t$ in the other direction of mass flow; and determining the direction of mass flow based on the ratio of the temperature differential signals $(T_h-T_a)/(T_t-T_a)$.

23. A mass flow sensor comprising:

a probe having a predetermined length for disposition in the path of mass flow;

a heating element integral to said probe for heating said probe;

a first thermocouple integral to said probe and extending substantially beyond the length of said probe for measuring a temperature $T_a$ of the mass flow outside of said probe;

a second thermocouple integral to said probe and disposed along the length of said probe in close proximity to the heating element for measuring a temperature $T_h$ of said probe at said heating element;

at least one third thermocouple integral to said probe and disposed along the length of said probe away from said heating element for measuring a temperature $T_t$ of said heated probe in the path of mass flow;

wherein said first and second thermocouples being coupled together to generate a first signal representative of the temperature differential $(T_h-T_a)$;

wherein said first and at least one third thermocouples being coupled together to generate a second signal representative of the temperature differential $(T_t-T_a)$; and means coupled to said first and second signals for processing said temperature differential signals to generate a signal representative of mass flow.

24. The sensor of claim 23 wherein the first thermocouple is disposed upstream of the at least one third thermocouple in the path of mass flow.

25. The sensor of claim 23 wherein the at least one third thermocouple includes one thermocouple disposed at the tip of the heated probe.

26. The sensor of claim 23 wherein the at least one third thermocouple includes a plurality of third thermocouples disposed along the length of the heated probe.

27. The sensor of claim 26 wherein the plurality of third thermocouples are interconnected in parallel to generate an average temperature measurement signal.

28. The sensor of claim 23 wherein the processing means includes means for generating the mass flow representative signal as a function of a ratio of the first and second differential temperature signals.

* * * * *